United States Patent Office 2,919,553
Patented Jan. 5, 1960

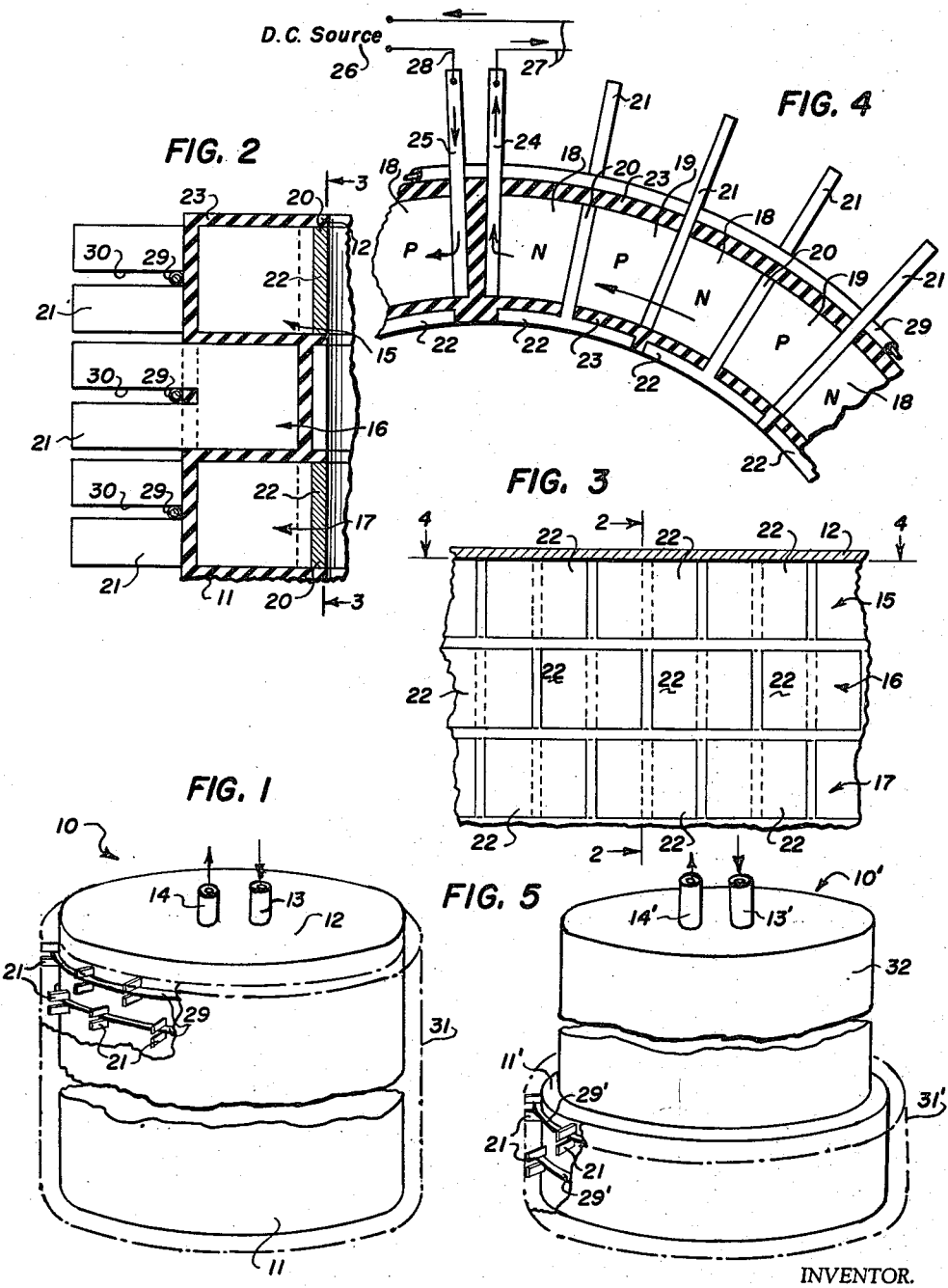

2,919,553

COMBINATION FLUID HEATER AND DEHUMIDIFIER

Robert W. Fritts, Elm Grove, Wis., assignor, by mesne assignments, to Minnesota Mining and Manufacturing Company, St. Paul, Minn., a corporation of Delaware Application August 15, 1957, Serial No. 678,293

9 Claims. (Cl. 62—3)

This invention relates to combination fluid heating and dehumidifying apparatus.

Dehumidifiers have become increasingly popular in recent years and are used most frequently in basements where the problem of high humidity is most acute. Another appliance that is most frequently installed in basements is the water heater. It is the general object of the present invention to provide in a single piece of equipment means for heating water as well as means for dehumidifying the ambient atmosphere surrounding said equipment.

Another object of the invention is to provide a combination fluid heater and dehumidifier wherein the fluid heating and the dehumidification are carried out in a novel manner by the utilization of thermoelectric, i.e., Peltier, heat pump means.

Another object of the invention is to provide a combination fluid heater and dehumidifier of the aforementioned character which is highly efficient, not only because of the fact that large amounts of heat are pumped by the heat pump means per unit of electrical power expended therein, but also because of the fact that both the heat absorbing and the heat emitting action of the heat pump means is utilized, i.e., the absorption of heat by the heat pump means is utilized to condense moisture from the ambient atmosphere to accomplish dehumidification of said atmosphere, and the emission of heat from the heat pump means is utilized for heating of the fluid to be heated.

Another object of the invention is to provide a combination fluid heater and dehumidifier as aforedescribed, wherein the fluid to be heated is accommodated within a receptacle, and the heat pump means forms a portion of said receptacle, or alternatively is engaged in heat transfer relation with said receptacle.

A more specific object of the invention is to provide a combination fluid heater and dehumidifier of the class described wherein the heat pump means takes the form of a bank of juxtaposed rows of alternately arranged dissimilar thermoelements serially joined by heat absorbing and heat emitting thermojunction members projecting from the opposite sides of said bank respectively.

Another object of the invention is to provide a combination fluid heater and dehumidifier which is characterized by its simplicity of construction, economy of manufacture and absence of moving parts, the latter minimizing maintenance and repair.

Other objects and advantages of the invention will become apparent as the description proceeds, reference being had to the drawing accompanying and forming a part of this specification, wherein:

Figure 1 is a fragmentary perspective view of one form of combination fluid heater and dehumidifier constructed in accordance with the inventive concept;

Figure 2 is an enlarged fragmentary vertical sectional view taken through the side wall and a portion of the upper end wall of the combination fluid heater and dehumidifier shown in Figure 1;

Figure 3 is a fragmentary vertical sectional view showing a portion of the inner surface of the combination heater and dehumidifier of Figure 1, said view being taken along the line 3—3 of Figure 2;

Figure 4 is a fragmentary sectional plan view taken along the line 4—4 of Figure 3; and Figure 5 is a fragmentary perspective view of another form of combination fluid heater and dehumidifier constructed in accordance with the inventive concept.

Referring now to Figure 1 of the drawing, the reference numeral 10 indicates a combination fluid heater and dehumidifier in the form of a cylindrical tank having an annular side wall 11 the ends of which are closed by end walls 12, only the upper of which is shown, suitable fluid inlet and exhaust connections 13 and 14 being provided in the upper end wall 12 as shown. The annular side wall 11 of the tank 10 comprises electroresponsive means for dehumidifying the ambient air and for simultaneously heating the fluid within said tank, said means taking the form of an annular or tubular bank of serially connected Peltier-type thermoelectric heat pumps which are operable when energized to condense moisture from the ambient air externally of said tank and to exhaust the heat absorbed from the ambient air to fluid on the inside of the tank.

More particularly, the annular wall or tubular bank 11 disclosed comprises a plurality of superimposed annular heat pump units, three of which, numbered 15, 16 and 17, are shown in Figures 2 and 3. Each of the annular heat pump units may be identical with the next, and each comprises alternately situated dissimilar thermoelements 18 and 19 (to be later described) which may be somewhat wedge-shaped in plan view, as shown in Figure 4. Electrically joining the thermojunction members 18 and 19 and interposed between alternate pairs thereof are the flat or plate-like body portions of thermojunction members 20 and 21. The thermojunction members 21 are substantially flat throughout their length and project radially outwardly from between the thermojunction members 18 and 19 joined thereby. The thermojunction members 20, however, are generally T-shaped in plan view, each having a generally rectangular head portion positioned for contact with the fluid within the tank 10. For ease of discussion, the thermojunction members 21 may be characterized as cold or heat absorbing thermojunction members, and the thermojunction members 20 as hot or heat exhausting thermojunction members.

Electrical and thermal insulation 23 forms a matrix for the annular heat pump units, said insulation being disposed in surrounding relation to the upper and lower surfaces as well as the inner and outer surfaces of the thermoelements 18 and 19 as shown, the outer or fin portions of the cold thermojunctions 21 protruding through the insulation covering the outer surfaces of the annular heat pump units for coaction with the ambient air as will be apparent. The insulation 23, as shown in Figure 4, also serves as electrically and thermally insulating spacing means between the head portions 22 of the thermojunction members 20 and the adjacent thermoelements 18 and 19.

Thermojunction members 20 and 21 serially connect all of the thermoelements 18 and 19 in a given annular unit, there being terminal thermojunction members 24 and 25 provided for each unit. By suitable connections to the terminal members 24 and 25 of each annular unit, all of said units are connected in series circuit with a source of direct current 26, as by conductors 27 and 28. Thus, current flows as shown by the arrows in Figure 4 from the source 26 through the conductor 28 to the terminal member 25 and thence to the thermoelement 18 joined thereto, from which it flows through the alternate thermoelements and thermojunction members until it reaches the terminal member 24. The current then flows through the successive annular units and back to the source 26 through the conductor 27.

As aforementioned, it is required that the thermoelements 18 and 19 be dissimilar. By this it is meant that they must be of opposite polarity, and depending upon the direction of current flow, so disposed that the junction between the thermoelements 18 and 19 pump heat from the cold or absorbing fins 21 to the exhaust fins 22. In a positive thermoelement heat flows in the direction of current flow, and in a negative thermoelement heat flows opposite to the direction of current flow.

Thus, as a given current flows from the direct current source 26 through the alternate thermoelements and thermojunction members in the direction indicated, heat is absorbed from the ambient air surrounding the extending fin portions of cold thermojunction members 21 and is pumped to the head portions 22 of the hot thermojunction members 20 for exhaustion to the fluid within the tank, thereby heating said fluid. When the temperature of the ambient air surrounding the cold thermojunction members 21 reaches the dew point, water vapor will tend to condense on the fin portions thereof and will drip therefrom into suitable collection means (not shown) provided therebelow.

While any suitable dissimilar materials exhibiting the required positive and negative characteristics may be used, it is preferred that thermoelements 18 and 19 be of materials which exhibit a high Peltier coefficient, low thermal conductivity and low electrical resistivity. More specifically, thermoelements 18 and 19 may be of the materials described in the copending application of Robert W. Fritts and Sebastian Karrer, Serial No. 512,436, filed June 6, 1956, now Patent No. 2,896,005, dated July 21, 1959. Such materials are semi-metallic alloys or compositions which may be characterized as binary metallic compounds of slightly imperfect composition, i.e., containing beneficial impurities constituting departures from perfect stoichiometry by reason of an excess of one of the metals over the other and/or containing beneficial impurities denominated as promoters. Such semi-metallic compositions also include mixtures of such binary metallic compounds, which may be denominated ternary metallic alloys or compositions. Certain of these alloys or compositions exhibit negative and certain exhibit positive electrical characteristics.

Means is provided for reinforcing the annular side wall 11, said means comprising annular members 29 in the form of an insulated rod or wire surrounding each of the annular units as shown in Figures 1, 2 and 4. As also shown in said figures, the external fin portions of the cold thermojunction members 21 are slotted as at 30 to accommodate the members 29, permitting the latter to compressively engage the insulation overlying the outer surfaces of the thermoelements 18 and 19. The members 29 are provided with suitable means (not shown) for placing the latter in tension so that the thermoelements 18 and 19 and the thermojunction members 20 and 21 therebetween are all compressively biased to render the composite assembly resistant to external shock.

As shown in dot-and-dash lines in Figure 1, the combination heater and dehumidifier 10 is preferably provided with some open type of screening apparatus 31 to prevent human contact with the projecting fin portions of the thermojunction members 21.

Figure 5 illustrates another form of combination fluid heater and dehumidifier, and the parts indicated in Figure 5 by primed reference characters correspond to similar parts in Figures 1 to 4 indicated by the same numerals unprimed. In Figure 5, the combination heater and dehumidifier 10' comprises a cylindrical metallic tank 32 having inlet and outlet connections 13' and 14' in the upper end wall thereof. In the form of the invention shown in Figure 5, an annular bank or collar 11', corresponding to an annular section of the side wall 11 of the tank 10 shown in Figures 1 to 4, surrounds the metallic cylindrical tank 32. The bank 11' has hot thermojunction members, which may be identical with the thermojunction members 20 shown in Figure 4, in good thermal contact with the metallic tank 32 for transmission of heat thereto for heating of fluid within said tank. The fluid heating and dehumidifying operation of the apparatus 10' is similar to that of the apparatus 10 of Figure 1. It will be observed that in the form of the invention shown in Figure 5, the collar or bank 11' need not be watertight, since the tank 32 constitutes the receptacle for the fluid to be heated. Further, the structure of Figure 5 permits the bank 11' to be removable from the tank 32.

As will be apparent to one skilled in the art, various changes and numerous modifications of the disclosed structure may be made without departing from the spirit of the invention, and all of such changes are contemplated as may come within the scope of the appended claims.

What is claimed as the invention is:

1. A combination liquid heater and dehumidifier comprising means defining a receptacle for liquid having thermoelectric heat pump means forming a wall portion thereof, said heat pump means being provided with heat emitting thermojunction means having portions exposed within said receptacle for heat transfer relation with a liquid therein, and also being provided with heat absorbing thermojunction means having portions exposed externally of said receptacle in heat transfer relation with the ambient atmosphere, energization of said heat pump means causing the latter to extract heat from said atmosphere and to transfer said heat to the liquid within said receptacle for heating the latter, absorption of heat at said heat absorbing thermojunction means tending to cause condensation thereon of moisture from the ambient atmosphere for dehumidification of the latter.

2. A combination liquid heater and dehumidifier comprising annular thermoelectric heat pump means defining a wall portion of a cylindrical receptacle for liquid, said heat pump means being provided with heat emitting thermojunction means having portions exposed within said wall portion in contact with the liquid therein for heat transfer relation therewith, said heat pump means also being provided with heat absorbing thermojunction means exposed externally of said wall portion in heat transfer relation with the ambient atmosphere, energization of said heat pump means causing the latter to extract heat from said atmosphere and to transfer said heat to the liquid in contact with said heat emitting thermojunction means, absorption of heat at said heat absorbing thermojunction means tending to cause condensation thereon of moisture from the ambient atmosphere for dehumidification of the latter.

3. A Peltier heat pump bank comprising first and second dissimilar thermoelements, and first and second thermojunction members having portions extending transversely of said bank and interposed between said first and second thermoelements, joining the same to afford thermojunctions therebetween, said first thermojunction members being substantially planar and having external fin portions extending transversely outwardly on one side of said bank, and said second thermojunction members being substantially T-shaped in cross-section and having substantially flat external portions exposed on the opposite side of said bank and having surfaces substantially coincident with the surface of said opposite side of said bank.

4. A Peltier heat pump bank comprising a plurality of rows of first and second dissimilar thermoelements connected in series circuit relation, and first and second thermojunction members having portions extending transversely of said bank and interposed between adjacent first and second thermoelements in a given row, joining the same to afford thermojunctions therebetween, said first thermojunction members being substantially planar and having external fin portions extending transversely outwardly on one side of said bank, and said second thermojunction members being substantially T-shaped in cross-section and having substantially flat external portions exposed on the opposite side of said bank and substantially coincident with the surface thereof.

5. An annular heat pump, comprising a plurality of first and second thermoelements of dissimilar thermoelectric material in annular arrangement, and first and second thermojunction members having flat portions interposed radially between said first and second thermoelements with the opposite surfaces of said flat portions electrically joined to said thermoelements to afford thermojunctions at said joints, said first thermojunction members having heat transfer portions exposed on the inner side of said heat pump, and said second thermojunction members having heat transfer portions exposed on the outer side of said heat pump.

6. An annular heat pump, comprising a plurality of juxtaposed substantially coaxial annular sub-assemblies of first and second thermoelements of dissimilar thermoelectric material in annular arrangement, and first and second thermojunction members having flat portions interposed radially between the first and second thermoelements of a given sub-assembly with the opposite surfaces of said flat portions electrically joined to said thermoelements to afford thermojunctions at said joints, said first thermojunction members having heat transfer portions exposed on the inner side of said heat pump, and said second thermojunction members having heat transfer portions exposed on the outer side of said heat pump.

7. An annular cylindrical heat pump, comprising a plurality of generally wedge-shaped first and second thermoelements of dissimilar thermoelectric material in annular arrangement, and first and second thermojunction members having flat portions interposed radially between said wedge-shaped first and second thermoelements with the opposite surfaces of said flat portions electrically joined to said thermoelements to afford thermojunctions at said joints, said first thermojunction members having heat transfer portions provided with surfaces exposed on the inner side of said heat pump and forming part of a cylindrical inner surface on said heat pump, and said second thermojunction members having heat transfer portions exposed on the outer side of said heat pump.

8. An annular cylindrical heat pump, comprising a plurality of juxtaposed substantially coaxial annular sub-assemblies of generally wedge-shaped first and second thermoelements of dissimilar thermoelectric material in annular arrangement, and first and second thermojunction members having flat portions interposed radially between said wedge-shaped first and second thermoelements of a given sub-assembly with the opposite surfaces of said flat portions electrically joined to said thermoelements to afford thermojunctions at said joints, said first thermojunction members having heat transfer portions provided with surfaces exposed on the inner side of said heat pump and forming part of a cylindrical inner surface on said heat pump, and said second thermojunction members having heat transfer portions exposed on the outer side of said heat pump.

9. An annular heat pump, comprising a plurality of first and second thermoelements of dissimilar thermoelectric material in annular arrangement, first and second thermojunction members having flat portions interposed radially between said first and second thermoelements with the opposite surfaces of said flat portions electrically joined to said thermoelements to afford thermojunctions at said joints, said first thermojunction members having heat transfer portions exposed on the inner side of said heat pump, and said second thermojunction members having heat transfer portions exposed on the outer side of said heat pump, and annular compression means surrounding and engaging the periphery of said annular assembly.

References Cited in the file of this patent

UNITED STATES PATENTS

| | | |
|---|---|---|
| 398,272 | Mestern | Feb. 19, 1889 |
| 413,136 | Dewey | Oct. 15, 1889 |
| 773,838 | Wightman | Nov. 1, 1904 |
| 1,818,437 | Stuart | Aug. 11, 1931 |
| 2,352,056 | Wilson | June 20, 1944 |
| 2,749,716 | Lindenblad | June 12, 1956 |

FOREIGN PATENTS

| | | |
|---|---|---|
| 1,108,370 | France | Jan. 12, 1956 |